United States Patent Office 3,488,388
Patented Jan. 6, 1970

3,488,388
N-SUBSTITUTED AMINOBENZENE-
CARBOXAMIDES
Elmar R. Altwicker, Somerville, and Leo Michaels, Nutley, N.J., assignors to Universal Oil Products Company, Des Plaines, Ill., a corporation of Delaware
No Drawing. Filed Mar. 29, 1967, Ser. No. 626,716
Int. Cl. C07c *103/82, 103/28;* C08f *51/60*
U.S. Cl. 260—558    5 Claims

ABSTRACT OF THE DISCLOSURE

Novel N-substituted aminobenzenecarboxamides useful as antioxidants or antiozonants prepared basically by reacting a phenylenediamine with an isatoic anhydride.

---

This invention relates to a new class of compounds and to compositions containing such compounds which are stabilized against deterioration caused by the action of ozone or oxygen. More particularly, this invention relates to a novel class of N-substituted aminobenzenecarboxamides.

The novel compounds of this invention may be represented by the following structural formula:

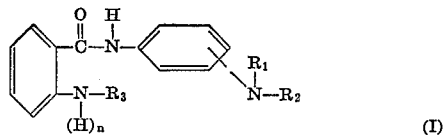

where $R_1$, $R_2$ and $R_3$, independently of each other, are selected from the group consisting of hydrogen, alkyl, cycloalkyl, aralkyl and aryl and $n$ is an integer of 0 or 1. The novel amides of this invention represented by the above general formula find wide application in the chemical field and are especially useful as plasticizers, ingredients of synthetic waxes or resins, precursors for pharmaceuticals or insecticides, or as antiozonants and antioxidants. Of these many uses, however, one of the more valuable present uses for these compounds is the stabilization of compositions against the deteriorating effects of oxygen or ozone. Of significance in this respect is that certain of these compounds, and particularly the compounds where the

group with $R_2$ being hydrogen is in the para position, are effective in the stabilization of rubbery polymers against oxygen attack.

Accordingly, an object of this invention is to provide a new class of compounds comprising N-substituted aminobenzenecarboxamides. Another object is to provide compositions stabilized against deterioration resulting from the action of oxygen or ozone. These and other objects of the invention will be apparent from the following further detailed description thereof.

The amides represented by Formula I above may, in general, be obtained principally or initially by condensing a phenylenediamine of the formula:

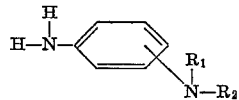

with an isatoic anhydride of the formula:

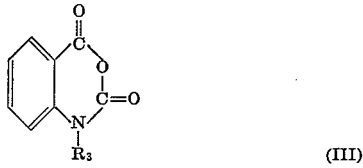

where $R_1$, $R_2$ and $R_3$ have the same significance as for Formula I above. Variations of the product of this initial reaction may be obtained by further treatment such as by reductive alkylation to add various different $R_1$, $R_2$ and $R_3$ groups or by simple alkylation to form the Schiff base compounds of this invention represented by Formula I where $n$ is 0.

Of the various phenylenediamines represented by Formula II above which may be used in the condensation reaction to prepare the compounds of this invention, the preferred diamines are para-phenylenediamine where the $R_2$ group is hydrogen. Examples of the phenylenediamines of Formula II includes: where $R_1$ and $R_2$ are both hydrogen, diamines such as: p-phenylenediamine, o-phenylenediamine, or m-phenylenediamine; where $R_1$ or $R_2$ or both are alkyl and preferably alkyl of from 1 to about 16 carbon atoms, diamines such as: N-pentyl-p-phenylenediamine, N,N' - dimethyl-m-phenylenediamine, N - sec - octyl - p - phenylenediamine, or N - sec-nonyl-p-phenylenediamine; where $R_1$ or $R_2$ or both are cycloalkyl and preferably cycloalkyl of from 5 to about 7 carbon atoms, such diamines as: N - cyclopentyl - p - phenylene diamine, N,N'-dicyclopentyl-m-phenylenediamine, or N-cyclohexyl-p-phenylenediamine; where $R_1$ or $R_2$ or both are aralkyl and preferably phenyl substituted alkyl where the alkyl group contains from 1 to about 5 carbon atoms, such diamines as: N-benzyl-p-phenylenediamine, or N-benzyl-m-phenylenediamine; or where $R_1$ or $R_2$ or both are aryl such as phenyl or naphthyl, such diamines as: N - phenyl-p-phenylenediamine, N,N'-diphenyl-p-phenylenediamine, or N-naphthyl-m-phenylenediamine.

The above illustrated specific phenylenediamines represent, of course, only a few of the many compounds of Formula II above which may be used to prepare the compounds of this invention. It should also be understood that the phenylenediamines may be ring substituted with such common groups as alkyl, halo or alkoxy; examples of which include: p-sec-octylamino-o-chloroaniline, or m-phenylamino-p-methoxyaniline. The isatoic anhydride represented by Formula III above is condensed with the phenylenediamine may, as indicated, have a substituent $R_3$ on the nitrogen atom. When the $R_3$ substituent of the ultimately desired product is to be a complicated group such as a Schiff base in combination with the nitrogen atom, that is, where $n$ of Formula I is 0, then it is preferable to use an isatoic anhydride where $R_3$ is hydrogen in the condensation reaction and then further treat the product to obtain the ultimae product having the desired $R_3$ group. Examples of the isatoic anhydride of Formula III which may be used in the reaction with the phenylenediamines include: where $R_3$ is hydrogen, isatoic anhydride, where $R_3$ is alkyl and preferably alkyl of from 1 to about 5 carbon atoms, anhydrides such as: N-methylisatoic anhydride, or N-ethylisatoic anhydride; where $R_3$ is cycloalkyl and preferably cycloalkyl of from 5 to about 7 carbon atoms such anhydrides as: N-cyclohexylisatoic anhydride, or N-cyclopentylisatoic anhydride; where $R_3$ is aralkyl and preferably phenyl substituted alkyl of from 1 to about 5 carbon atoms such anhydrides as: N-benzylisatoic anhydride; or where $R_3$ is aryl and preferably phenyl such anhydrides as N-phenylisatoic anhydride. It should be understood that the above compounds only represent a few of the many compounds of Formula III above which may be used to prepare the compounds of this invention. It should also be understood that the isatoic anhydride may be ring substituted with various common substituents such as halo, alkoxy, or alkyl groups; examples of which include 6-chloroisatoic anhydride, or N-methyl-6-chloroisatoic anhydride.

In effecting the reaction of the phenylenediamine of the above Formula II with an isatoic anhydride of the above Formula III to prepare the amides of this invention, the conditions and procedures used may be widely varied. Generally, the conditions and procedures commonly employed in the preparation of amides by the reaction of an amine with an acid anhydride may be satisfactorily used for the preparation of the compounds of this invention. Typically, the reaction may be conducted by charging the desired phenylenediamine and isatoic anhydride to a reaction vessel, preferably admixed with a suitable solvent such as an alcohol or ether such as dioxane, followed by stirring and heating the reactants for a period of time sufficient to complete the reaction. The temperature used may be varied but it usually ranges from about 25° to 150° C., or when a solvent is used, then atmospheric refluxing temperature is conveniently utilized. The reaction period will differ depending upon the reactants and the temperature but usually it ranges within a period of a few minutes to several hours. The ratio of reactants is not overly important. However, to prevent the formation of by-products, the isatoic anhydride should not be used in excess and a stoichiometric proportion of one mol of the phenylenediamine per mol of the isatoic anhydride may be used under most circumstances. After the condensation reaction is complete, the desired product may be recovered from the reaction mixture and purified by conventional methods including distillation and crystallization. Examples of the compounds of this invention represented by Formula I where $n$ is 1 include:

N-(p-methylaminophenyl)-2-aminobenzenecarboxamide,
N-(m-ethylaminophenyl)-2-methylaminobenzenecarboxamide,
N-(p-dimethylaminophenyl)-2-aminobenzenecarboxamide,
N-(p-sec-octylaminophenyl)-2-aminobenzenecarboxamide,
N-(p-cyclohexylaminophenyl)-2-aminobenzenecarboxamide,
N-(p-benzylaminophenyl)-2-aminobenzenecarboxamide,
N-(p-phenylaminophenyl)-2-methylaminobenzenecarboxamide,
N-(m-phenylaminophenyl)-2-aminobenzenecarboxamide,
N-(p-phenylaminophenyl)-2-methylaminobenzenecarboxamide,
N-(p-phenylaminophenyl)-2-cyclohexylaminobenzenecarboxamide, or
N-(p-phenylaminophenyl)-2-phenylaminobenzenecarboxamide.

When the Schiff base compounds represented by Formula I where $n$ is 0 or other compounds of this invention having complex $R_3$ groups, are desired, then, as indicated above, it is preferable to use an N-unsubstituted isatoic anhydride in the initial reaction with the desired phenylenediamine, and then further treat the condensation product, represented by Formula I where $R_3$ is hydrogen and $n$ is 1, to obtain the desired ultimate product. In effecting this further treatment to prepare the Schiff base, the condensation product, for example N-(p-phenylaminophenyl)-2-aminobenzenecarboxamide, may be reacted according to conventional alkylation procedures with a suitable aldehyde or ketone in the presence of a solvent such as xylene at atmospheric refluxing temperature. Suitable aldehydes or ketones include isobutanal, pentanal, octanal, pentadecanal, benzaldehyde or naphthaldehyde, acetone, 2-pentanone, octanone or nonanone. Examples of the Schiff base represented by Formula I above where $n$ is 0 which may be thus prepared, include: N-(p - methylaminophenyl)-2-isobutylideneaminobenzenecarboxamide, N - (p - sec-octylaminophenyl)-2-butylideneaminobenzenecarboxamide, or N-(p-phenylaminophenyl)-2-benzylideneaminobenzenecarboxamide. The Schiff base thus prepared may, if desired, be converted to the corresponding saturated products, that is, the compounds of Formula I where $n$ is 1, by reducing the Schiff base in the presence of hydrogen and a reduction catalyst at elevated temperature and pressure according to conventional procedures. Alternatively, these reduced products may be obtained directly in one step by using reductive alkylation procedures. This reductive alkylation reaction may be effected by reacting the desired aldehyde or ketone with a compound of this invention represented by Formula I where $n$ is 1 and $R_3$ is hydrogen in the presence of a reduction catalyst and hydrogen, and, if desired, a solvent. Suitable catalysts for this purpose include Raney nickel, palladium, platinum, platinum oxide, nickel-platinum, copper or molybdenum as well as mixture thereof. Elevated temperatures are used and generally range from about 90° to 300° C. in association with elevated hydrogen pressure ranging from about 50 to 3000 pounds per square inch. When the reductive alkylation is complete, the product may be recovered and purified by conventional procedures.

As hereinbefore indicated, the novel compounds of this invention are particularly useful in stabilizing compositions against the deteriorating effects of oxygen or ozone. The compositions which may be stabilized according to this invention by incorporating these compounds therein, in general, comprise any material which is deleteriously affected by the action of either ozone or oxygen. Examples of these compositions include petroleum products, for example, unsaturated gasolines or lubricating oils; edible fats and oils, for example, linseed oil or lard; polyolefins, for example, polyethylene or polypropylene; olefin copolymers, for example, ethylene and propylene; rubbery polymers including both natural rubber and synthetic rubber, for example, homo-polymers or copolymers of butadiene, isoprene, and similar aliphatic conjugated diolefin hydrocarbons, such as butadiene-styrene copolymer rubber, butadiene-vinyl-pyridine copolymer rubber, isobutylene-isoprene copolymer rubber, ethylene-propylene-conjugated diolefin or non-conjugated diolefin or non-conjugated diolefin terpolymer or polychloroprene.

The compounds of this invention may be added to the above illustrated classes of compositions, either individually or in admixture, according to any of the standard procedures commonly used for incorporating antiozonants or antioxidants into polymeric materials. These compositions may also, if desired, contain additional conventional antioxidants or antiozonants which, in combination with the compounds of this invention, may result in the formation of synergistic compositions. The amount of the compounds of this invention added to stabilize the compositions may be widely varied with the particular amount added in any case being dependent upon such factors as the particular composition being stabilized, the particular compound or compounds being added and whether the composition is being stabilized against oxidation or ozonolysis or both. For example, in the instance where rubbery polymers are being stabilized, the amount of the compound added usually ranges from about 0.5 to 10 weight parts per 100 weight parts of the rubbery polymer, with from about 0.1 to 5 weight parts per 100 weight parts usually being preferred.

The following examples are cited to illustrate the novel compounds of this invention and stabilized compositions containing such compounds. They are not, however, intended to limit the broad scope of this invention to the specific compounds prepared or the stabilized compositions illustrated therein.

EXAMPLE I

N - (p - phenylaminophenyl) - 2 - aminobenzenecarboxamide was prepared by charging a mixture of 16.3 grams (0.1 mol) of isatoic anhydride, 18.4 grams (0.1 mol) of N-phenyl-p-phenylenediamine and 300 milliliters of ethanol to a reaction flask equipped with heating and stirring means. The mixture was heated to reflux temperature and maintained thereat for about 6 hours. The mixture was then cooled and a portion of solvent was removed by vacuum distillation, whereupon a crude product crystallized which was subsequently recovered by filtration. The crude product was recrystallized from benzene to yield the product having a melting point of 150° to 151° C.

EXAMPLE II

N - (p - phenylaminophenyl) - 2 - methylaminobenzenecarboxamide was prepared by charging a mixture of 17.7 grams (0.1 mol) of N-methyl isatoic anhydride, 18.4 grams (0.1 mol) of N-phenyl-p-phenylenediamine and 250 milliliters of p-dioxane to a reaction flask equipped with heating and stirring means. The mixture was heated to reflux temperature and maintained thereat for about 10 hours whereupon the solvent was removed by distillation under reduced pressure. The residue was crystallized from ethanol to recover 32 grams of product having a melting point of 149° to 150° C.

EXAMPLE III

N - (p - phenylaminophenyl) - 2 - isobutylideneaminobenzenecarboxamide was prepared by charging 6 grams of N-(p-phenylaminophenyl)-2-aminocarboxamide, 6 milliliters of isobutanal and 100 milliliters of xylene to a reaction flask equipped with heating and stirring means. The mixture was heated to reflux and maintained thereat for about 15 hours. After cooling, the solvent was removed by distillation under reduced pressure. The residue was crystallized from methanol to recover 7 grams of product melting at 163° to 168° C.

EXAMPLE IV

N - (p - n - butylaminophenyl) - 2 - aminobenzenecarboxamide was prepared by first forming the N-n-butyl-p-phenylenediamine reactant by reducing 10 grams of N-n-butyl-p-nitroaniline in the presence of palladium charcoal catalyst and ethanol at low hydrogen pressure and at about 25° C. The hydrogenation product was then filtered and to the filtrate was added 8.4 grams of isatoic anhydride. The resulting solution was then refluxed for about 3 hours, then concentrated to dryness and the residue recrystallized from chloroform to obtain about 12 grams of product having a melting point of 88° to 90° C.

EXAMPLE V

Certain compounds of this invention were evaluated as antioxidant additives as follows:

A natural rubber tread stock of the following recipe:

| Ingredient: | Parts by weight |
|---|---|
| Smoked sheet | 100.00 |
| Statex R | 45.00 |
| Zinc oxide | 5.10 |
| Stearic acid | 3.00 |
| Sulfur | 2.50 |
| Santocure | 0.75 |
| Antioxidant | As indicated | was cured for 40 minutes at 140° C. The cured rubber was then cut into test strips and aged for 2 and 7 day periods at 90° C. The strips were then subjected to the following tests, together with blank samples containing no antioxidant and the results are reported in the table below. The compounds tested, the concentrations and code numbers for the table are as follows:

| Compound | Code | Concentration Parts per 100 Parts of Rubber |
|---|---|---|
| N-(p-phenylaminophenyl)-2-methylaminobenzenecarboxamide | 1 | 3.00 |
| N-(p-phenylaminophenyl)-2-aminobenzenecarboxamide | 2 | 3.00 |

TABLE

| | Shore A Hardness | | Ultimate Elongation, Percent | | | 200% Modulus, p.s.i. | | | 300% Modulus, p.s.i. | | | Tensile Strength, p.s.i. | | |
|---|---|---|---|---|---|---|---|---|---|---|---|---|---|---|
| Days aged | 0 | 7 | 0 | 2 | 7 | 0 | 2 | 7 | 0 | 2 | 7 | 0 | 2 | 7 |
| Sample: | | | | | | | | | | | | | | |
| Blank | 63.5 | 62.5 | 475 | 285 | 100 | 1,300 | 1,275 | | 2,340 | | | 4,030 | 2,180 | 396 |
| #1 | 67.0 | 69.0 | 475 | 395 | 325 | 1,145 | 1,560 | 1,545 | 2,085 | 2,655 | 2,405 | 3,765 | 3,570 | 2,635 |
| #2 | 62.0 | 74.0 | 500 | 410 | 370 | 1,065 | 1,460 | 1,590 | 2,150 | 2,420 | 2,535 | 3,735 | 3,445 | 3,055 |

We claim as our invention:

1. A compound of the formula:

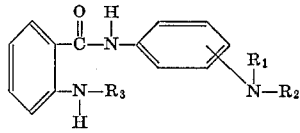

where $R_1$ is alkyl containing from one to 8 carbon atoms, benzyl, cyclohexyl or phenyl; $R_2$ is hydrogen; $R_3$ is hydrogen, alkyl containing from one to 8 carbon atoms, cycloalkyl containing 5 or 6 carbon atoms, phenyl or benzyl, the

group being located para or meta to the carboxamide group.

2. The compound according to claim 1 characterized in that it is N-(p-phenylaminophenyl)-2-aminobenzenecarboxamide.

3. The compound according to claim 1 characterized in that it is N-(p-phenylaminophenyl)-2-methylaminobenzenecarboxamide.

4. N-(p-phenylaminophenyl) - 2 - isobutylideneaminobenzenecarboxamide.

5. The compound according to claim 1 characterized in that it is N-(p-n-butylaminophenyl) - 2 - aminobenzenecarboxamide.

References Cited

UNITED STATES PATENTS

| 2,150,190 | 3/1939 | Rossander et al. | 260—558 |
| 2,161,628 | 6/1939 | Mathieu et al. | 260—558 |

OTHER REFERENCES

Niementowski, Berichte: vol. 32, pp. 1464–69 (1899).
Chemical Abstracts, vol. 51, columns 5094–95 (Jennen Article) (1957).

HENRY R. JILES, Primary Examiner

HARRY I. MOATZ, Assistant Examiner

U.S. Cl. X.R.

252—401; 260—45.9, 107, 814